2,694,691
Patented Nov. 16, 1954

2,694,691

NONFLAKING HEAT RESISTANT COUMARONE-INDENE ALUMINUM PAINT

Morris Braunstein, Cleveland, Ohio, assignor to The Sheffield Bronze Paint Corporation, Cleveland, Ohio No Drawing. Application May 13, 1952,
Serial No. 287,593

3 Claims. (Cl. 260—33.6)

This invention relates to protective coatings for iron and particularly to a rust preventing and heat resistant aluminum paint.

Conducive to a better understanding of this invention it may be well to point out that commercially pure or wrought iron, upon exposure to moist air, soon becomes covered with a reddish brown film which is commonly called "rust." Analysis of this rust shows it to be a mixture of different compounds whose composition varies with the age of the rust. Ferrous and ferric oxide, together with carbonic acid resulting from the solution of carbon dioxide in water, are usually present as well as hydrated ferrous and ferric oxide and basic ferrous and ferric carbonates.

Many methods have been used in an effort to retard or break this rusting cycle, since the corrosion and deterioration of the iron or steel frames of many large bridges and buildings has involved the loss of many millions of dollars and possibly thousands of human lives. The first logical preventative method was to coat the iron with some water repelling or non-hydrous coating such as oil, grease, fat, etc. Later paints were evolved which combined drying oils with metallic compounds of lead, zinc, iron oxide, etc. Of these, the lead paints became the most popular but even they did not give the complete protection required against rusting.

Attention was first drawn to aluminum as a protective coating for iron against rust because it was known that in the steel making process oxidation of the molten iron was prevented by the addition of small amounts of aluminum (0.16% to 0.05%) to the molten mass in the Siemens-Martin or Bessemer process. Therefore, aluminum has been the subject of considerable research in the past 25 to 35 years in its application as a rust inhibitor or preventative for iron and steel surfaces. At first aluminum in either powder or flake form was combined with conventional lead paint, which yielded a greatly improved product.

In the early 1920's the Paint and Varnish Research Association in Washington, D. C., ran numerous tests on aluminum in comparison with red and blue lead, zinc powder, etc. Test strips were exposed to weathering with the result that further experiments were thought justified when it was found that iron surfaces coated with a primer of lead paint overlaid by a finish coat of aluminum paint were still in good condition after 52 months of exposure. Later the American Railway Association ran numerous experiments with excellent results, in which aluminum paint was used on both steel and wood.

All these experiments related to materials which were exposed to normal outdoor weathering. However, modern industry provides many situations where the surface to be protected is exposed to heat running up to 1000° or more Fahrenheit. Aluminum paints in common use become discolored at such elevated temperatures and also flake off upon being repeatedly heated and cooled. Under the microscope, ordinary aluminum paint films after heating appear to be covered with minute eruptions which are presumed to be caused by the vaporization of absorbed moisture on the silica contaminated surface of the iron. These erupted areas become fissured which permits entrance of moisture with resultant rusting beneath the aluminum coating and subsequent flaking off thereof.

An aluminum paint that will not discolor when applied to metallic surfaces that are heated as high as 1600° Fahrenheit was disclosed in my co-pending United States patent application Serial No. 260,306, filed December 6, 1951. However, the paint film described therein was found to be subject to flaking when heated above 1000° F., even though no color change occurred. Furthermore, the metal surface to be protected had to be completely free of all dirt, grease, rusts, etc. before the protective coating of aluminum paint was applied if maximum protection and length of life of the aluminum film was to be secured.

The primary object of this invention, therefore, is to provide an aluminum paint that will not flake off iron surfaces which are subjected to temperatures as high as 1300° F. in the case of wrought iron, or 1700° F. in the case of cast iron.

Another object is to provide a rust preventing coating of the type stated that will have greatly improved adhesive qualities for iron at elevated temperatures.

A further object is to provide an aluminum paint that can be applied to iron surfaces that are merely free of loose particles, but not necessarily clear of all dirt, oil and rust, and still yield a protective film having superior adhesive and anti-flaking properties at elevated temperatures.

Still another object is to provide a film that neutralizes the normally hygroscopic properties of the surface of wrought and cast iron, thereby preventing the formation of rust.

Further objects are to provide a film that dries rapidly, is durable and pliable, and can be used either indoors or outdoors under all conditions of weather.

In perfecting this invention, I have found that the addition of the calcium salts of aromatic organic acids such as napthoic and phthalic acid or the higher acids of the paraffin or related series (such as the fatty acids of the type that are soluble in hydrocarbon solvents) to the aluminum paint mixture yields a protective coating for iron that has greater adhesive properties than any thing used heretofore. Absolutely no flaking or rusting occurs on wrought iron surfaces heated as high as 1300° F. and on cast iron surfaces heated up to 1700° F. Above these temperatures the iron surface itself may begin to flake, but the aluminum paint still adheres to the flakes which have the aluminum film on one side and raw iron on the other side. In fact, it has been found that the flaking of the unprotected metal will occur at temperatures much below these, which indicates that the improved coating not only has superior adhesive properties but also reacts chemically with the iron to retard distintegration of the metal surface itself. Furthermore, it has been found that after the temperature of the coated surface is raised above 800° the permanency of the coating is established and the film cannot be removed even when treated with the paint solvent originally used.

A typical formulation is as follows:

(1) Pounds
Calcium naphthanate (5% calcium metal)_____ 8
Coumarone-indene resin_____ 112
Neutral oil_____ 10
Toluol_____ 250
Aluminum paste or powder in quantity to yield a paint having two pounds of aluminum per gallon.

The neutral oil may be paraffin oil or wax, its purpose being to retard surface evaporation of the applied film, thereby avoiding the formation of pin-holes in the film which are created if a surface crust is formed before the underlying liquid has dried. The use of toluol as a solvent is preferred due to the low percentage of binding material present, since it will evaporate quickly, thereby reducing the possibility of sagging of the film when applied to vertical surfaces. However, other solvents such as xylol or mineral spirits may be substituted in the same amount if desired.

Other satisfactory formulations are:

(2) Pounds
Calcium naphthanate (5% calcium metal)_____ 14
Coumarone-indene resin_____ 112
Neutral oil_____ 50
Toluol_____ 350
Aluminum paste or powder in quantity to yield a paint having two pounds of aluminum metal per gallon.

(3)

| | Pounds |
|---|---|
| Calcium phthalate | 8 |
| Coumarone-indene resin | 112 |
| Neutral oil | 10 |
| Toluol | 250 |

Aluminum paste or powder in quantity to yield a paint having two pounds of aluminum per gallon.

(4)

| | Pounds |
|---|---|
| Calcium phthalate | 14 |
| Coumarone-indene resin | 112 |
| Neutral oil | 50 |
| Toluol | 350 |

Aluminum paste or powder in quantity to yield a paint having two pounds of aluminum per gallon.

(5)

| | Pounds |
|---|---|
| Calcium palmitate | 8 |
| Coumarone-indene resin | 112 |
| Neutral oil | 10 |
| Toluol | 250 |

Aluminum paste or powder in quantity to yield a paint having two pounds of aluminum per gallon.

(6)

| | Pounds |
|---|---|
| Calcium palmitate | 14 |
| Coumarone-indene resin | 112 |
| Neutral oil | 50 |
| Toluol | 350 |

Aluminum paste or powder in quantity to yield a paint having two pounds of aluminum per gallon.

(7)

| | Pounds |
|---|---|
| Calcium stearate | 8 |
| Coumarone-indene resin | 112 |
| Neutral oil | 10 |
| Toluol | 250 |

Aluminum paste or powder in quantity to yield a paint having two pounds of aluminum per gallon.

(8)

| | Pounds |
|---|---|
| Calcium stearate | 14 |
| Coumarone-indene resin | 112 |
| Neutral oil | 50 |
| Toluol | 350 |

Aluminum paste or powder in quantity to yield a paint having two pounds of aluminum per gallon.

(9)

| | Pounds |
|---|---|
| Calcium oleate | 8 |
| Coumarone-indene resin | 112 |
| Neutral oil | 10 |
| Toluol | 250 |

Aluminum paste or powder in quantity to yield a paint having two pounds of aluminum per gallon.

(10)

| | Pounds |
|---|---|
| Calcium oleate | 14 |
| Coumarone-indene resin | 112 |
| Neutral oil | 50 |
| Toluol | 350 |

Aluminum paste or powder in quantity to yield a paint having two pounds of aluminum per gallon.

It will be seen that both alkyl and aryl organic calcium compounds when added to the coumarone-indene type aluminum paint produce a film that has superior adhesive and anti-flaking properties when applied to iron surfaces that are subjected to elevated temperatures. Furthermore, the presence of the calcium in the form of an organic salt enables the paint to be applied to surfaces that are not free of grease or rust as is normally the case in industry. The exact reason for the extreme durability of the aluminum film caused by the presence of the organic calcium compounds is not clearly understood, but is believed to be due to the high electrical potential of calcium ($-2.76$) with reference to aluminum ($-1.70$) and iron ($-0.44$). The calcium being more electro-negative at the elevated temperatures encountered, reacts thermoelectrically with the aluminum and iron to reduce the degree of their oxidation at its own expense. The aluminum and iron are maintained in their metallic state and are not oxidized. Therefore, the tendency to flake off is substantially retarded.

It is difficult to say just what kind of change occurs between the aluminum and the iron after these organic compounds have been burned away upon heating the iron above 1000° F., but the remaining coating shows no eruptions or breaks in its surface even under the microscope, due, perhaps, to a thermo-coupling action aided by the metallic calcium present in the residue. Therefore no flaking occurs even after repeated heating and cooling under humid conditions. This indicates that a coating of this type does stop rusting from occurring beneath the protective film, such as happens habitually with the prior art aluminum paints when applied to heated surfaces.

It is to be understood that the invention is not limited to the use described herein, but includes all other uses to which a protective aluminum paint film of this character may be put.

I claim:

1. A rust preventing and non-flaking heat resistant aluminum paint consisting essentially of 8 parts calcium naphthanate, 112 parts coumarone-indene resin, 10 parts paraffin oil, 250 parts of an aromatic hydrocarbon solvent, all of said portions being by weight, and sufficient aluminum powder to yield a paint having two pounds of metallic aluminum per gallon.

2. A rust preventing and non-flaking heat resistant aluminum paint consisting essentially of 14 parts calcium naphthanate, 112 parts coumarone-indene resin, 50 parts paraffin oil, 350 parts of an aromatic hydrocarbon solvent, all of the said portions being by weight, and sufficient aluminum paste to yield a paint having two pounds of metallic aluminum per gallon.

3. An article of manufacture comprising sheet iron which has been coated with a composition consisting essentially of 8 to 14 parts of calcium naphthanate, 112 parts coumarone-indene resin, 10 to 50 parts paraffin oil, 250 to 350 parts of an aromatic hydrocarbon solvent, all of said portions being by weight, and sufficient aluminum powder to yield a paint having two pounds of metallic aluminum per gallon.

References Cited in the file of this patent

Resins and Plasticizers, Neville Co., 1945, page 57.
Bennett: Concise Chem. & Tech. Dictionary, 1947, page 654.